July 9, 1968  G. W. HOWARD  3,391,574
TENSION TESTER FOR WIDE BELTS
Filed Aug. 26, 1966  2 Sheets-Sheet 2
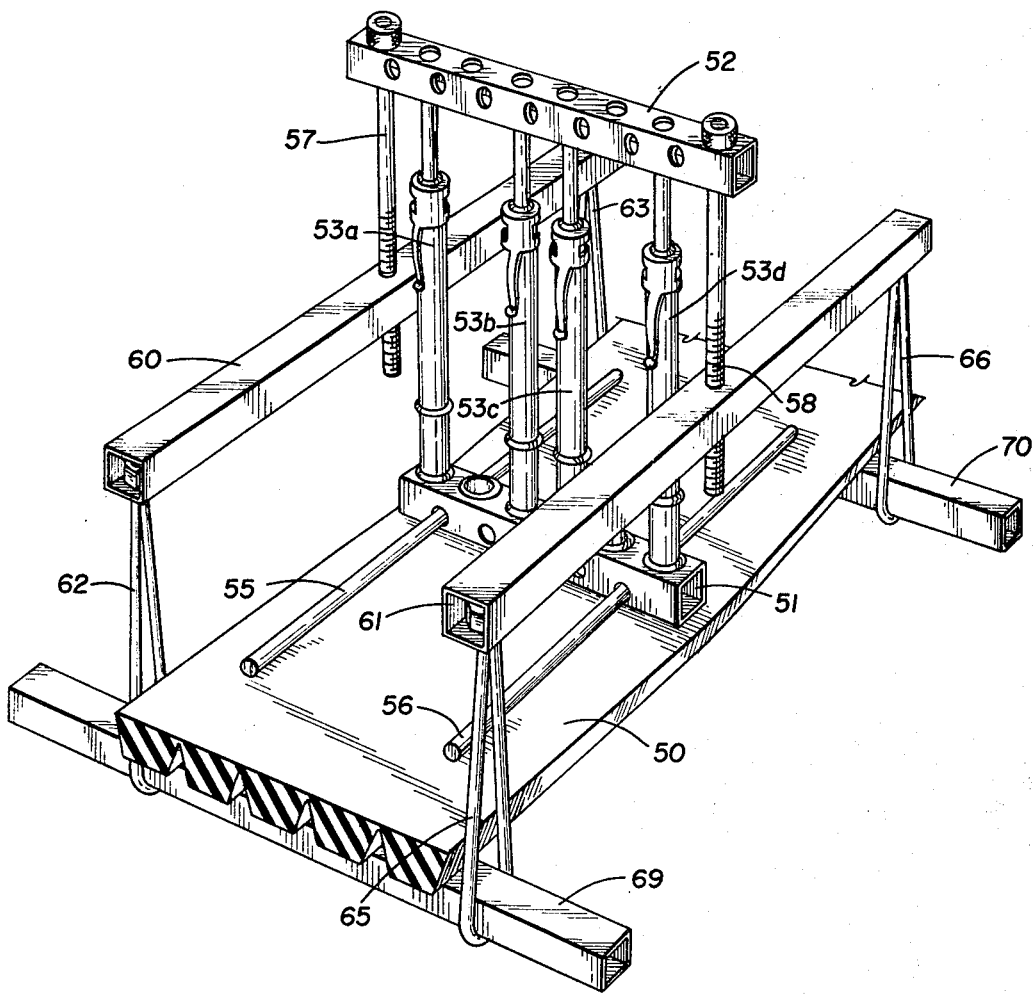
Fig_3
INVENTOR.
GRAHAM W. HOWARD
BY
Richard D. Law
ATTORNEY 3,391,574
TENSION TESTER FOR WIDE BELTS
Graham W. Howard, 5996 S. Crocker St.,
Littleton, Colo. 80120
Filed Aug. 26, 1966, Ser. No. 575,349
7 Claims. (Cl. 73—144)

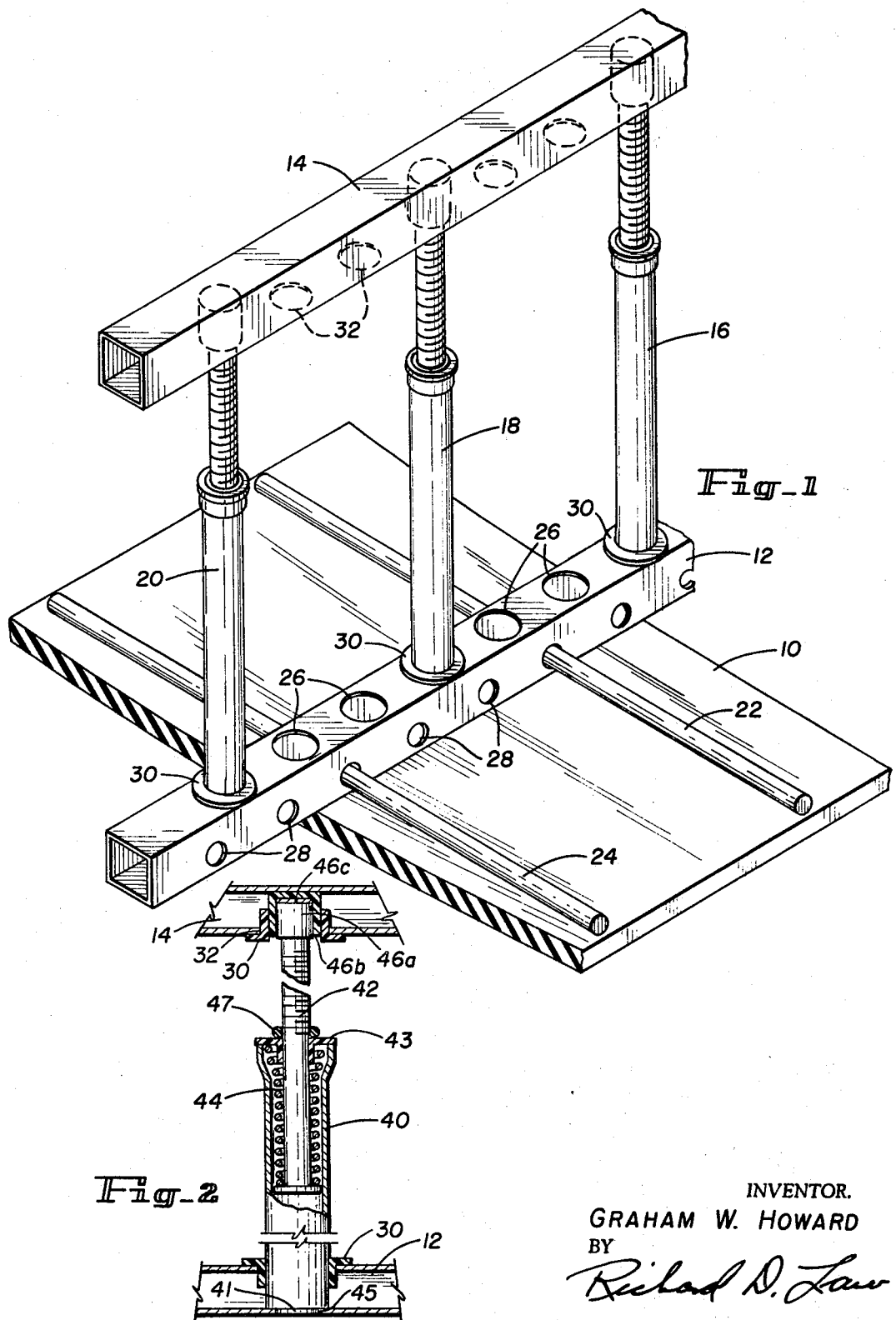

This invention relates to improvements in belt tension measuring devices, particularly for wide width, industrial type drive belts.

The use of belt drives has steadily increased due to the increase in use of all types of machinery requiring either a rotary motion transfer from a rotary motor or engine or from a reciprocating engine to rotary members to a driven rotary member. Proper belt tension for a belt drive is just tight enough between two sheaves to carry the required load without slippage between the belt and the sheaves. A belt which is too loose reduces efficiency of the drive and increases wear on the belt and the sheaves. A belt which is too tight places undue stress on the bearings supporting the shafts of the sheaves, and the strain on the belt substantially decreases the life of the belt. In either event, the life expectancy of the belt is substantially reduced and the value of the belt is substantially decreased. The accepted procedure for determining tension in a belt is to exert a measurable force directed perpendicularly to the belt surface at the center of the span so as to depress the belt to a measured amount. In the English mensuration system the deflection of the belt is $\frac{1}{64}$ of an inch per inch of span, and in the metric system it is one millimeter per 100 milimeters of span. The force necessary to deflect the belt these amounts is a function of the tension in the belt. The ratio of Force (F) divided by Tension (T) or $F/T$ for the true force diagram is $\frac{1}{16}$ for a deflection of $\frac{1}{64}$ of an inch per inch of span (the American System) and is $\frac{1}{25}$ for 1 mm. per 100 mm. of span (Metric System).

In U.S. Patent No. 3,171,278, issued Mar. 2, 1965 to Graham W. Howard, Jr., entitled, "Belt Tension Tester," and in my copending application Ser. No. 479,421, filed Aug. 13, 1965, entitled "Drive Belt Tensioning Determining Apparatus," now Patent 3,352,153, spring biased belt testers are shown and described which provide satisfactory means for measuring the force for deflection of narrow belts and belts of light duty having low tension. In larger belts having a high tension in which a substantal amount of force is required to deflect the belt the prescribed amount, the described testers have not been entirely satisfactory. This is particularly true for wide belts since the testers described have quite small bases which rest on the belt. Thus, tension across the width of the belt cannot be taken with these devices.

According to the present invention I provide a belt tension tester which is arranged to test the tension across the width of the drive belt on which it is mounted, and, in one form, includes means for supporting the tester on the belts to produce the proper angle of deflection when such belts are too wide for proper deflection by a force applied at one point. The device of the invention includes at least two adapter bars arranged to support a plurality of low tension belt testers for cooperative action one with the others. For increasing the overall force required for deflection of a belt, the tester, also, includes a harness which is arranged to secure the belt tester temporarily on a belt and to provide means for causing the deflection of the belt under an applied force to produce the proper angle of the deflection for wide belts.

Included among the objects and advantages of the invention is to provide a belt tension tester for wide belts of the industrial drive type.

Another object of the invention is to provide means for varying the force measuring system of a belt tension tester.

Another object of the invention is to provide a wide belt tension tester inclusive of frame means for temporarily supporting the tester on a belt and for producing a proper angle of deflection of wide belts.

These and other objects and advantages of the invention may be readily ascertained by referring to the following description and appended illustrations in which:

FIG. 1 is a perspective view of one form of the invention arranged for testing the tension in a wide drive belt;

FIG. 2 is a side elevational view, partially in section, of one type of a spring biased element of a wide belt tester according to the invention; and FIG. 3 is a perspective view of a modified form of the invention, showing the holding harness for the belt tester on a wide belt.

The belt tester, shown in FIG. 1, is mounted on a belt 10 and it includes a lower adapter bar 12 and an upper adapter bar 14 releasably secured together by means of modular units which are spring biased tension elemnets 16, 18 and 20, described below. The bar 12 is provided with two feeler rods 22 and 24 which extend through the bar onto each side a sufficient distance to determine the angle of test. The bar 12 is, also, provided with openings 26 (in one form they are spaced ¾" apart) which may be used for additional testers where the tension of the belt requires the use of more spring biased testers, or for different positioning for the tension members. The bar includes additional holes 28 extending along the bottom and at right angles to the openings 26 for supporting the feeler rods or for different placement of the feeler rods. Each of the elements 16, 18 and 20 are secured in the lower bar by means of plastic grommets 30 which temporarily secure the elements in the bar. The lower end of the tension member has a circular boss which fits in an opening in the bottom of the bar so as to be flush with the bar bottom and to provide with the grommet a rigid but temporary attachment to the bar, as explained below. The upper bar 14 is provided with a series of openings 32 for supporting the tops of a plurality of different numbers of spring biased elements and openings correspond in alignment with the openings 26 in the bottom. While the bar 14 is shown with holes in one side, it may be made identical to the lower bar 12 for convenience in use and manufacture. The connection between the tops of the tension members is flexible enough so as to tell when the belt is out of line or when it otherwise takes more force to attain the test angle on one side of the wide belt than on the other side.

One form of a spring biased measuring device is shown in FIG. 2, the description of one being sufficient for the description of the others, includes a barrel 40 of a tubular shape having a circular boss 41 on its bottom end arranged to fit in the openings 45 in the bar 12. A graduated plunger 42 is mounted through a nylon bushing 43 in an opening in the top of the barrel. An extension, helical spring 44 secured adjacent the top of the barrel and adjacent the bottom of the plunger provides a means for measuring force exerted on the top of the plunger.

Mounted on top of the plunger 42 is a pair of plastic caps 46a and 46b with a thin metal disc 46c therebetween fitted in a plastic grommet 30 in the openings 32 in the bar. The plastic caps are soft, flexible plastic which permits some movement of the plungers angularly in relation to the bar. The small diameter of the top of the plunger does not permit sideway push on the plunger. An O-ring 47 mounted on the plunger 42 provides means for indicating the depth of penetration of the plunger into the barrel on movement of the plunger into the barrel. The graduations may be calibrated in force or tension, depending on the requirements of the use to which the tester is put. The O-ring is normally pushed into position against the bushing 43 prior to any pressure being applied on the plunger so that movement of the plunger into the barrel pushes through the O-ring, and on release the O-ring stays in the position on the graduated plunger indicating the innermost penetration of the plunger into the barrel. As shown in FIG. 1, three such tension members are shown secured between the lower and upper bars to provide a spring resistance against the force applied to the upper bar for depressing the belt 10. The amount of force is easily determined by adding the O-ring reading on each scale to determine the average, from which the total pressure required for the depression of the belt may be determined.

The pressure is applied on the upper bar, which depresses the belt 10 so that a contact is made between both ends of the feeler rod 22 and 24, and forming with the contact of the bar 12 with the belt a three-point contact. The points of contact are the bar 12 and the two ends of each feeler rod. The device for proper use must be held perpendicularly to the surface of the belt 10, so that at the start of the movement of the upper bar 14 toward the belt, an equal movement occurs between the ends of the feeler rod and the belt. As shown in FIG. 1, the feeler rod 24 is of a predetermined diameter which is smaller than the diameter of the openings 28. This provides an automatic adjustment for either the American (1/64 inch deflection per 1 inch of span) or the metric (1 mm. per 100 mm. of span) systems. The metric system is achieved when the feeler rod touches the bottom of the holes (on opposed sides of the bar) in the bar and the ends just touch the belt. This provides the correct angle of $F/T$ ratio$=1/25$. By depressing the belt further until the feeler rod touches the top of the opposed holes and the ends just touch the belt the deflection is 1/64 inch per inch of span or $F/T$ ratio$=1/16$. In one instance, for example, with a particular belt the force necessary to deflect the belt under the metric system (1 mm. per 100 mm. of span) is 29 kg. (64 pounds). The same belt requires 100 pounds to deflect it 1/64 inch per 1 inch of span.

For wide and thick belts the device of FIG. 3 is of particular value since it provides means for bending the belt at about the instrument itself. As shown, a belt 50, which is a composite belt of five V-belts interconnected together by the top surface, has a tension tester mounted thereon. The tester includes lower bar 51 and upper bar 52 interconnected by means of spring tension measuring devices 53a through 53d, there being four mounted in openings with grommets similar to that shown in FIG. 1, and are balanced about a center line through the tester. A pair of feeler rods 55 and 56 are mounted through the base bar 51 for contacting the belt on depression thereof. One or more feeler rods may be used. Extending from the ends of the top bar 52 are a pair of bolts 57 and 58 (which may be slotted head bolts for use with a coin or screwdriver) which extend downwardly from the top toward the belt. A pair of side bars 60 and 61 are reciprocably secured respectively to the rods 57 and 58 and extend substantially parallel to the feeler bars 55 and 56. Suspended from the end of the bar 60 is a drop loop 62 at one end and 63 at the opposite end. In a similar manner a drop loop 65 is secured to one end of the bar 61 and a similar loop 66 is secured to the opposite end of the bar 61. A support bar 69 is arranged to be passed under the belt 50 and through the loops 62 and 65 at the one end and a similar bar 70 is arranged to be passed under the belt and through the loops 66 and 63 at the opposite end. A nut (not shown) is mounted on each of the bolts on the underside of the bar so as to hold the bar on the bolt. The head of each bolt 57 and 58 may be knurled for turning, or may be provided with a slot for a screwdriver or coin for turning the bolt to move the nuts under the bars 60 and 61, moving the same up and down the bolt.

By pulling up on the bolt, pressure is exerted on the top bar 52 to depress the belt between the support bars 69 and 70, and with sufficient pressure the ends of the feeler bars may be brought into contact with the belt, providing the three-point contact with the proper angle of depression of the belt. The force can be determined from the penetration of the plungers of the tension members. The force required to form the three-point contact is determined by adding the indicated force on all the tension members. With this arrangement the tester can be secured temporarily to the belt and thus used by a single workman, and is particularly valuable when the pressure is greater than can be applied by hand pressure to get the three-point contact. In this way, by providing a plurality of the spring tension devices a substantial pressure may be introduced to depress the belt to the proper angle for testing the tension. The bars 51 and 52 may be decreased in length or increased in length, depending upon the width of the belt and any number of the tension testers may be added to the unit to correspond with the pressures necessary for proper tension of the particular belt. The flexible loops assure that no outside force is induced in the system.

From the foregoing, it may be seen that a tester of the invention that, while the invention has been illustrated by reference to particular embodiments, there is no intent to limit the spirit or scope of the invention to the precise details so set forth except as defined in the following claims.

I claim:
1. A tension tester for wide belts, comprising a lower bar arranged to extend laterally from side to side of the belt to be tested; an upper bar arranged to be mounted above said lower bar and perpendicularly to the belt in use, there being a plurality of holes in said lower bar and a plurality of mating holes in said upper bar, each set of holes arranged to be perpendicularly positioned one above the other relative to the belt in use; at least two feeler rods mounted in and normal to said lower bar and each having ends extended an equal and predetermined distance beyond said bar, and the ends thereof offset above the bottom of said bar a predetermined distance so as to form a three-point contact between the bottom of said bar and the ends of said feeler rods with the belt when the belt is depressed below its normal resting point by force exerted on said lower bar; and a plurality of spring biased tension members, each cooperatively mounted in a set of said holes between said upper and lower bars and arranged to be mounted substantially perpendicularly to the belt in use so as to transfer pressure exerted on the upper bar to the lower bar, each including means to resiliently resist pressure exerted on said upper bar, and at least one of said tension members having means to indicate the force necessary to depress said upper bar to obtain said three-point contact.

2. A tension tester according to claim 1 wherein said spring biased tension members are removably mounted in said sets of holes.

3. A tension tester according to claim 1 wherein said spring biased tension members include a hollow barrel, a plunger reciprocably mounted in said barrel and a helical spring attached at one end to an upper part of said barrel and to said plunger at its opposite end.

4. A tension tester according to claim 1 wherein a bolt is suspended from each end of said upper bar, a support bar mounted for reciprocable movement on said bolt extending substantially parallel to an axis longitudinally of said belt, and means extending from each end of one of said support bars under said belt to the end of the other said support bar for supporting said tester on a belt, and means for moving said support bars upwardly and downwardly on said bolts.

5. A tension tester according to claim 4 wherein said means extending from each support includes a flexible loop suspended from each support bar end and a connecting bar extending from loop to loop under the belt.

6. A tension tester according to claim 1 wherein said upper and lower bars include mating holes for supporting more than three tension members, and a plurality of holes are provided in the lower bar for supporting said feeler bars at a plurality of positions.

7. A tension tester according to claim 1 wherein said lower bar is a rectangular tube having tension member supporting holes in one face and feeler rod holes in the faces at right angles thereto.

References Cited

UNITED STATES PATENTS

| 2,723,561 | 11/1955 | Chaya et al. | 73—144 |
| 3,296,857 | 1/1967 | Kaczeus | 73—144 |

FOREIGN PATENTS

| 155,743 | 7/1932 | Switzerland. |

RICHARD C. QUEISSER, *Primary Examiner.*

J. H. WILLIAMSON, *Assistant Examiner.*